United States Patent [19]
Frantz et al.

[11] 3,719,859
[45] March 6, 1973

[54] VOLTAGE SENSING AND SWITCHING CIRCUIT

[75] Inventors: Richard J. Frantz, Cheshire; Alton R. Morris, Rocky Hill, both of Conn.

[73] Assignee: Arrow-Hart, Inc., Hartford, Conn.

[22] Filed: Aug. 31, 1971

[21] Appl. No.: 176,587

[52] U.S. Cl. ............... 317/31, 307/235, 307/290, 323/9
[51] Int. Cl. ............... H03k 3/295, H02h 3/08
[58] Field of Search....... 307/290, 23 S; 323/22 T, 22 SC, 323/24, 4, 9; 317/27, 31; 328/147

[56] References Cited

UNITED STATES PATENTS

| | | | |
|---|---|---|---|
| 3,302,037 | 1/1967 | Neumann | 307/290 |
| 3,383,522 | 5/1968 | Apfelbeck et al. | 317/31 X |
| 3,593,040 | 7/1971 | Graham | 307/290 X |
| 3,473,107 | 10/1969 | Smalley | 323/24 X |
| 3,125,715 | 3/1964 | Brooks | 323/22 T |

OTHER PUBLICATIONS

Wireless World July 1970; Pg. 316

*Primary Examiner*—Gerald Goldberg
*Attorney*—Davis, Hoxie, Faithfull & Hapgood

[57] ABSTRACT

A circuit to sense variations in alternating voltage applied to a load and to interrupt power flow to the load on reduction of the applied voltage, including a rectifier to rectify the alternating voltage, a voltage regulator to apply a constant level part of the rectified voltage as the power supply to a Schmitt trigger, part of the rectified voltage controlling conductivity of a transistor that provides the input signal to the Schmitt trigger according to variations in the rectified alternating applied voltage, a Zener diode to reference the Schmitt trigger at a voltage slightly below the voltage applied to the transistor controlling the trigger, a Zener diode at the output of the trigger to control the presence or absence of signals from the Schmitt trigger to a further transistor that controls the gate of a triac connected in the power line to the load, and the triac being gated to a non-conductive state to block power flow to the load upon reduced alternating applied power. Said circuit also can be used to sense variations in direct current voltage applied to a load and to interrupt power flow to the load on reduction of the applied voltage, in which circumstance no rectifier is used and the direct current applied voltage is utilized in the same manner as the rectified voltage when alternating voltage variations are being sensed.

7 Claims, 2 Drawing Figures

VOLTAGE SENSING AND SWITCHING CIRCUIT

This invention is directed to a circuit that senses small variations of predetermined line voltage applied between two terminals to a load connected therebetween, and that interrupts the flow of power from the terminals to the load upon the line voltage dropping a small increment below its rated value. Power again is applied to the load upon the applied voltage rising to its predetermined value.

Many electrical devices are designed to operate at a rated voltage, and a reduction from this rated voltage can cause damage to the electrical device. An example of such a device is the coil circuit for a contactor of an electrical motor, with a reduced voltage to the coil circuit causing damage to both the contactor and motor. By use of the present invention, small reductions in voltage can be sensed and responded to, to interrupt power flow to a load such as the exemplary coil circuit until the applied voltage goes back to its rated or predetermined value.

In the present invention, the alternating voltage across the two terminals is rectified, and a portion of the rectified voltage which is variable in proportion to variations in the alternating voltage is applied to control the conductivity of a transistor which in turn provides control input signals to a Schmitt trigger circuit. The Schmitt trigger has a constant level supply voltage derived by a voltage regulator from the rectified voltage, and means are provided to reference the Schmitt trigger at a sufficiently high voltage level to allow small percentage variations in the applied alternating voltage to control the operation of the Schmitt trigger. Means are provided at the output of the Schmitt trigger to result in the presence or absence of an output signal depending on the operative configuration of the trigger circuit, and the presence of an output signal controls the conductivity of a transistor that in turn controls the gate of a solid state switch connected in the line of power flow to the load. Small reductions of alternating voltage from the normal predetermined value operate the Schmitt trigger to render the solid state switch non-conductive to block power flow to the load.

Objects and advantages of the present invention include the provision of a voltage sensing and switching circuit which is sensitive to small percentage variations in applied voltage, which provides the presence or absence of a control signal to a device controlling power flow to the load dependent upon the value of applied voltage, which provides precise switching control, and which derives its power supply from the applied voltage.

These and other objects and advantages of the invention will be apparent upon consideration of the following description and attached drawing, in which.

Figure 1:
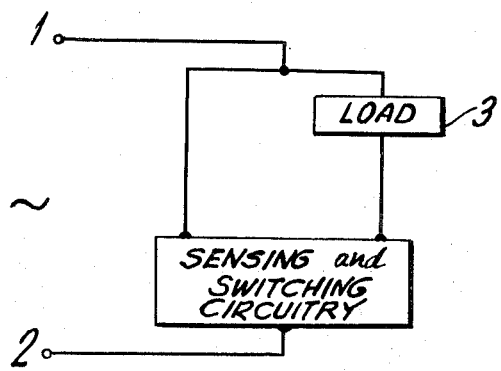
FIG. 1 illustrates the invention in block form.

FIG. 1 shows an alternating potential applied across terminals 1 and 2, suitable for energizing a load 3 which may be any one of various types requiring voltage protection. The sensing and switching circuitry of FIG. 1 is designed to allow power to flow to load 3 from terminals 1 and 2 when a predetermined alternating voltage level is present at said terminals, and to block power flow to load 3 when the alternating voltage level at the terminals drops below its predetermined value. Terminal 2 may be at ground potential or may be another phase line of a multiphase system.

Figure 2:
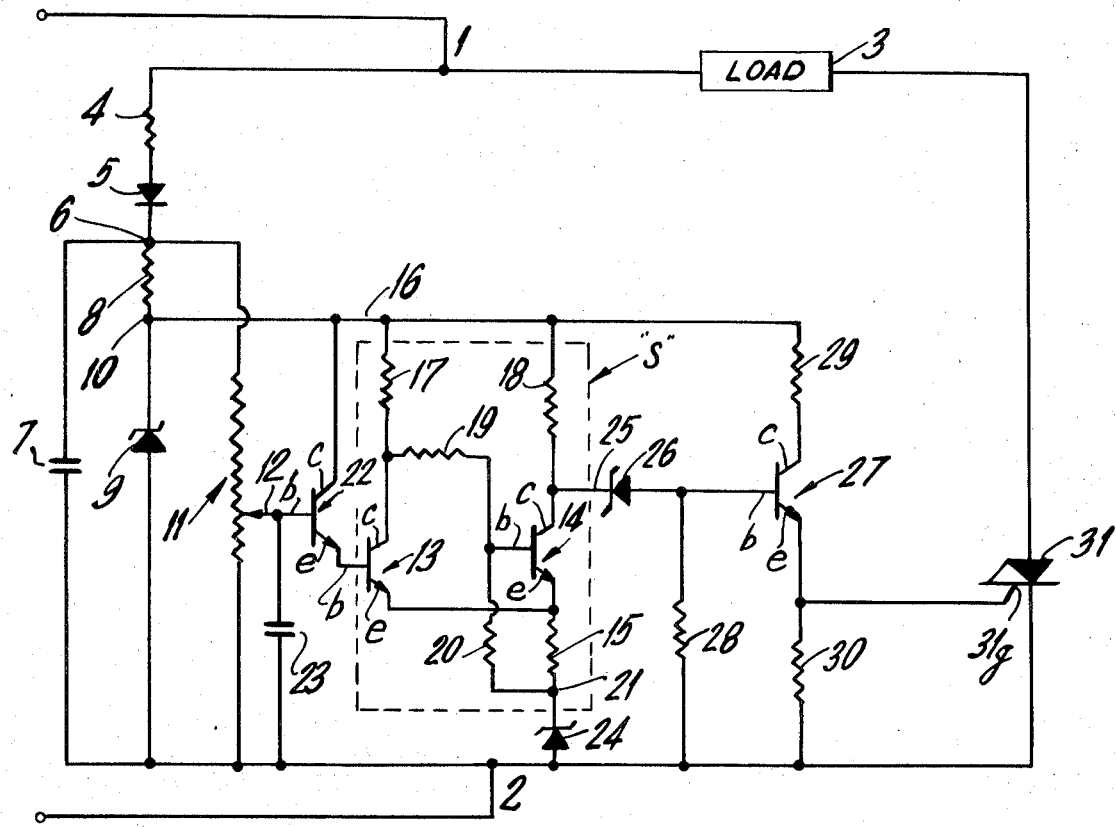
FIG. 2 is a circuit diagram of the invention illustrating the voltage sensing and switching circuitry shown in block form in FIG. 1.

Referring to FIG. 2, an alternating voltage applied between the terminals 1 and 2 is lowered by voltage dropping resistor 4 and is rectified by diode 5. The lowered pulsating direct current voltage at junction 6 is then filtered to take out the pulsations by capacitor 7 extending between junction 6 and terminal 2. The voltage at junction 6 also is further dropped by voltage dropping resistor 8, and Zener diode 9 connected between resistor 8 and terminal 2 acts as a voltage regulator to maintain a constant level of direct current voltage at junction 10. The voltage at junction 10 is a portion of the rectified voltage at junction 6 and is not effected by variations in the voltage at junction 6 occurring due to variation in the alternating voltage between terminals 1 and 2.

The voltage at junction 6 is also dropped through resistance voltage divider 11 extending between junction 6 and terminal 2, and tap 12 which is variable in position along the voltage divider takes off a portion of the rectified voltage at junction 6. The voltage on tap 12 will vary in proportion to variations in the alternating voltage between terminals 1 and 2, and tap 12 thus serves to sense these variations.

Shown enclosed within dotted lines in FIG. 2 is a Schmitt trigger circuit "S" having input transistor 13 and output transistor 14. The emitters 13e and 14e of these transistors are connected to one another, and the common connection is then connected to emitter resistance 15. The base 13b of transistor 13 is the input of the Schmitt trigger circuit and the output of the Schmitt trigger is taken on line 25 connected to collector 14c of transistor 14. The supply voltage to the Schmitt trigger circuit is obtained from the constant voltage level at junction 10 and is present on line 16 extending from said junction. The supply voltage is thus self-contained within the circuit of the present invention, and no exterior supply source of direct current voltage is required. Collector resistances 17 and 18 are connected between supply line 16 and the collectors 13c and 14c of the transistors 13 and 14, respectively. Resistance 19 is connected between collector 13c of transistor 13 and base 14b of transistor 14, and resistance 20 is connected between base 14b of transistor 14 and junction 21 at the lower end of common emitter resistance 15.

The Schmitt trigger operates in a manner whereby one of its two transistors is conductive when the other is not, and the presence or absence of an appropriate input signal determines which transistor is conducting. Resistances 19 and 20 provide the regenerative feedback of the trigger. A triggering input signal will render transistor 13 conductive and transistor 14 non-conductive, and an insufficient input signal will render transistor 13 non-conductive and transistor 14 conductive. The Schmitt trigger will provide a high level output signal when transistor 13 conducts and a low level output signal when transistor 14 conducts. As is common in a Schmitt trigger, its inherent hysteresis results in one voltage level of input signal operating transistor 13 from a conductive to a non-conductive state, and a slightly higher voltage level of input signal being required to operate transistor 13 from its non-conductive state back to its conductive state.

Tap 12 of voltage divider 11 is connected to the base 22b of transistor 22, and capacitor 23 extending between base 22b and terminal 2 filters out transient and ripple voltages which may be present at base 22b. Collector 22c of transistor 22 is connected to the supply voltage present on line 16, and emitter 22e of transistor 22 is connected to the base 13b of the transistor 13 of the Schmitt trigger. Emitter 22e of transistor 22 accordingly supplies the input signal to the Schmitt trigger circuit. Transistor 22 will be rendered highly conductive or much less conductive according to small changes in the signal on its base 22b, with its highly conductive condition providing a sufficient emitter current to turn on transistor 13 and turn off transistor 14 of the Schmitt trigger, and its less conductive condition providing for the turning off of transistor 13 and the turning on of transistor 14 of the Schmitt trigger. The signal to base 22b of transistor 22 varies in proportion to variations in voltage between terminals 1 and 2 as reflected at tap 12, and transistor 22 therefore will control the operation of the Schmitt trigger according to variations in the alternating voltage between terminals 1 and 2. Transistor 22 also provides a high impedance at the input of the Schmitt trigger to prevent excessive current flow and voltage drop through the upper part of voltage divider 11 and into the Schmitt trigger under normal predetermined voltage conditions at terminals 1 and 2. These conditions would otherwise occur in the absence of transistor 22 to disrupt the operation of the sensing circuitry. Transistor 22 further allows small changes in voltage at tap 12 to result in sizable changes in conductivity of transistor 22 to provide thereby a precise triggering of the Schmitt trigger.

Zener diode 24 is connected between junction 21 and terminal 2, and has the function of referencing the Schmitt trigger at a fixed voltage above that of terminal 2 and only slightly lower than the voltage normally present at tap 12 for a predetermined line voltage normally applied between terminals 1 and 2. Zener diode 24 thereby greatly increases the sensitivity of the Schmitt trigger, so that the trigger transistors will change their operating configurations upon a small percentage variation in the alternating voltage normally at 1 and 2. Without diode 24, a percentage deviation of approximately fifty percent would be required across voltage divider 11 in order to operate the Schmitt trigger, since the Schmitt trigger would be turning off with about one-half volt at its input, and would be turning on with about 1 volt at its input. With diode 24, the one-half volt differential to operate the Schmitt trigger will be in relation to a much higher voltage that can be established at tap 12, and this differential therefore will represent a small incremental change in that high voltage.

The voltage on tap 12 may be varied by varying the position of the tap on voltage divider 11, thereby allowing fine tuning of the circuit.

Zener diode 26 is connected between the output line 25 of the Schmitt trigger and the base 27b of transistor 27. When transistor 14 of the Schmitt trigger is conducting, an insufficient voltage will be present at collector 14c of transistor 14 to break down the diode, and no output signal from the Schmitt trigger will pass across the diode. When transistor 14 is not conducting, however, a sufficient voltage will be present at collector 14c to cause an output signal from the Schmitt trigger through the diode to the base 27b of transistor 27. Diode 26 therefore provides a clear presence or absence of output signal from the Schmitt trigger to transistor 27 depending upon the operative configuration of the trigger. If diode 26 is not present, the Schmitt trigger will provide either a high or low output signal to transistor 27 depending upon the operative configuration of the trigger.

The collector 27c of transistor 27 is connected to collector resistance 29 which is in turn connected to the constant supply voltage on line 16. The emitter 27e of transistor 27 is connected to emitter resistance 30 which in turn is connected to terminal 2. Resistance 28 is connected between base 27b of transistor 27 and terminal 2, and provides a leakage path to prevent leakage currents obtaining false triggering of transistor 27 when transistor 14 is conducting. Emitter 27c of transistor 27 also is connected to gate 31g of triac 31. Triac 31 is connected between load 3 and terminal 2, and gating signals to its gate 31g control the conductivity of triac 31 and accordingly the flow of alternating current power to load 3. When a gating signal is applied from transistor 27 to the triac gate 31g, the triac will conduct, and the absence of such a signal will render the triac non-conductive.

Turning to the operation of the present invention, the normal predetermined voltage between terminals 1 and 2 will establish a rectified voltage at tap 12 and a current at base 22b of transistor 22 sufficient to render transistor 22 highly conductive. Emitter 22e of transistor 22 will then provide a triggering input signal to the Schmitt trigger to render its input transistor 13 conductive and its output transistor 14 non-conductive. There will then be a high enough voltage on collector 14c of transistor 14 to cause output current flow from the Schmitt trigger across Zener diode 26 and to the base 27b of transistor 27. Transistor 27 will conduct, and emitter 27e will apply a gating signal to gate 31g of triac 31. Triac 31 will be rendered conductive, and power will flow between terminals 1 and 2 through load 3. If the normal predetermined voltage between terminals 1 and 2 should drop below rated value by a small increment, determined by the voltage at junction 21, the circuit constants of the Schmitt trigger, and the setting of tap 12 on voltage divider 11, the current at base 22b of transistor 22 will render transistor 22 much less conductive so that its emitter 22e will not provide a strong enough signal to the input of the Schmitt trigger to maintain input transistor 13 in a conductive state. Transistor 13 accordingly will not conduct and transistor 14 then will become conductive. The voltage at collector 14c of transistor 14 will now be insufficient to break down Zener diode 26, and no output signal will be provided from the Schmitt trigger to base 27b of transistor 27. Transistor 27 will not conduct, no signal will be provided from emitter 27e to gate 31g of triac 31, and triac 31 will not conduct. The lowered alternating voltage between terminals 1 and 2 accordingly has acted through the circuitry of the present invention to block power flow to load 3. When the alternating voltage between terminals 1 and 2 again rises, the circuitry will operate as previously explained to again provide power flow to load 3.

The circuit of FIGS. 1 and 2 also can be used to sense variations in direct current voltage applied at terminals 1 and 2 and to interrupt power flow to load 3 upon small reduction of the voltage at terminals 1 and 2. In this instance, rectifier diode 5 and filter capacitor 7 are not used and the rest of the circuitry remains the same.

Examplary circuit values for the described invention, corresponding to the numbering of FIG. 2, are as follows:

Resistors (Ohms)
4 – 5K, 3 watts
8 – 5K, 3 watts
11 – 460K, 0.5 watts
15 – 1K, 0.5 watts
17 – 56K, 0.5 watts
18 – 33K, 0.5 watts
19 – 270K, 0.5 watts
20 – 390K, 0.5 watts
28 – 10K, 0.5 watts
29 – 10K, 0.5 watts
30 – 1K, 0.5 watts Capacitors
7 – 15 mf.
23 – 0.22 mf.

Zener Diodes
9 – 32 v.
24 – 16 v.
26 – 24 v.

Transistors
13, 14, 22, 27 – Fairchild 2N3569
Triac
31 Hudson H 14399

Source
120 volts, 60 cycle A.C.

The foregoing description illustrates the principles of the invention applied to an individual embodiment, and the invention is to be interpreted in a scope consistent with the spirit of its principles.

What is claimed is:

1. An undervoltage sensing circuit having first and second terminals, comprising:
    a Schmitt trigger circuit having an input first transistor and an output second transistor, the emitter of said transistors being connected to one another and to a common emitter resistance;
    means for applying a constant level portion of an applied voltage across the first and second terminals as the supply voltage to said Schmitt trigger circuit;
    means for deriving a portion of said applied voltage, which portion is variable in proportion to variations in said applied voltage;
    means for applying an input signal to said Schmitt trigger of a value determined by said derived variable portion of said applied voltage;
    means including a zener diode connected between said Schmitt trigger circuit emitter resistance and said second terminal for referencing said trigger circuit at a voltage level intermediate said derived variable portion of said applied voltage and the voltage at said second terminal to increase the sensitivity of said Schmitt trigger circuit;
    said Schmitt trigger circuit providing a high level output signal at a predetermined level of applied voltage across said first and second terminals and providing a low level output signal at a lower level of applied voltage across said first and second terminals.

2. An undervoltage sensing circuit as claimed in claim 1 wherein:
    said means for deriving a portion of said applied voltage comprises a voltage dividing resistance means.

3. An undervoltage sensing circuit as recited in claim 1 wherein:
    said input signal applying means includes a fourth transistor having its collector connected to said constant level applying means and its emitter connected to the base of said input first transistor of said Schmitt trigger circuit, and a voltage divider and tap for applying said derived variable portion of said applied voltage to the base of said fourth transistor.

4. An undervoltage sensing circuit as recited in claim 1 including:
    threshold means coupled to said output second transistor for conducting when said Schmitt trigger produces a high level output signal; and
    gate means coupled to said threshold means which is enabled by said threshold means.

5. An undervoltage sensing circuit as recited in claim 4 wherein:
    said threshold means includes a third transistor, and a zener diode coupled to the collector of said output second transistor and to the base of said third transistor, and said gate means includes a triac having its gate coupled to the emitter of said third transistor.

6. An undervoltage sensing circuit as recited in claim 5 including:
    a leakage resistance connected between the base of said third transistor and said second terminal.

7. An undervoltage sensing circuit as recited in claim 5 wherein:
    said undervoltage sensing circuit is electrically connected in parallel with a load, one side of said triac being connected to said load, the other side of said triac being connected to said second terminal, said load also being connected to said first terminal.

* * * * *